(12) United States Patent
Olive et al.

(10) Patent No.: US 11,496,451 B2
(45) Date of Patent: *Nov. 8, 2022

(54) SYSTEMS AND METHODS FOR ENCRYPTED VEHICLE DATA SERVICE EXCHANGES

(71) Applicant: Honeywell International Inc., Charlotte, NC (US)

(72) Inventors: Michael L. Olive, Cockeysville, MD (US); Xiaozhong He, Laurel, MD (US)

(73) Assignee: Honeywell International Inc., Charlotte, NC (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/028,302

(22) Filed: Sep. 22, 2020

(65) Prior Publication Data

US 2021/0006547 A1 Jan. 7, 2021

Related U.S. Application Data

(62) Division of application No. 15/970,522, filed on May 3, 2018, now Pat. No. 10,819,689.

(51) Int. Cl.
*H04L 29/06* (2006.01)
*H04L 9/40* (2022.01)
(Continued)

(52) U.S. Cl.
CPC .......... *H04L 63/062* (2013.01); *H04L 9/0866* (2013.01); *H04L 63/0853* (2013.01);
(Continued)

(58) Field of Classification Search
CPC . H04L 63/062; H04L 9/0866; H04L 63/0853; H04L 2463/061; H04L 9/0825;
(Continued)

(56) References Cited

U.S. PATENT DOCUMENTS

| 4,874,942 A | 10/1989 | Clauser |
| 4,992,656 A | 2/1991 | Clauser |

(Continued)

FOREIGN PATENT DOCUMENTS

| CN | 104994112 A | 10/2015 |
| EP | 1463265 A2 | 9/2004 |
| WO | 2017147207 A1 | 8/2017 |

OTHER PUBLICATIONS

U.S. Patent and Trademark Office, "Notice of Allowance", U.S. Appl. No. 16/894,529, dated Mar. 17, 2021, pp. 1 through 35, Published: US.

(Continued)

*Primary Examiner* — Baotran N To
(74) *Attorney, Agent, or Firm* — Fogg & Powers LLC

(57) ABSTRACT

Encrypted vehicle data service exchanges are provided. In one embodiment, a vehicle communication manager comprises memory storing an embedded public key (EPK) for a data service; a processor executing a vehicle data service protocol to initiate a session with the data service. The protocol causes the processor to: transmit a session request to the data service and receive a session reply, the reply indicates if the manager is authorized for encrypted service, the processor validates authenticity of the session reply using the EPK; determine whether to enable message encryption, and transmit an initialization request indicating whether encryption is elected; generate a key derivation key (KDK) and transmit the KDK to the data service; receive an initiation response confirming whether message encryption is elected; and when elected generate at least one Message Encryption Key (MEK) from the KDK; encrypt data service uplink and downlink messages using the at least one MEK.

11 Claims, 8 Drawing Sheets

(51) Int. Cl.
*H04W 4/40* (2018.01)
*H04L 9/08* (2006.01)
*H04W 12/04* (2021.01)

(52) U.S. Cl.
CPC ......... *H04W 4/40* (2018.02); *H04L 2463/061* (2013.01); *H04W 12/04* (2013.01)

(58) Field of Classification Search
CPC ....... H04L 9/0861; H04L 9/14; H04L 9/3247; H04L 2209/84; H04L 63/12; H04L 67/12; H04L 63/0435; H04L 63/0428; H04L 9/0822; H04L 63/10; H04L 67/14; H04L 9/06; H04W 4/40; H04W 12/04; G07C 5/008

See application file for complete search history.

(56) References Cited

U.S. PATENT DOCUMENTS

| | | | |
|---|---|---|---|
| 6,677,888 | B2 | 1/2004 | Roy |
| 7,194,618 | B1 | 3/2007 | Suominen |
| 7,317,184 | B2 | 1/2008 | Kasevich et al. |
| 7,437,756 | B2 | 10/2008 | Bleumer |
| 7,512,714 | B2 | 3/2009 | Eckert |
| 7,816,643 | B2 | 10/2010 | Hyodo |
| 7,835,734 | B2 | 11/2010 | Eckert et al. |
| 7,952,999 | B1 | 5/2011 | Jiang et al. |
| 8,688,987 | B2 | 4/2014 | Kirk et al. |
| 8,966,074 | B1 | 2/2015 | Richards et al. |
| 9,134,450 | B2 | 9/2015 | Desruelle et al. |
| 9,160,539 | B1 | 10/2015 | Juels et al. |
| 9,215,228 | B1 | 12/2015 | Zhang et al. |
| 9,294,340 | B1 | 3/2016 | Logue et al. |
| 10,219,154 | B1 | 2/2019 | Hallock |
| 10,321,310 | B1 | 6/2019 | Scheer et al. |
| 10,715,511 | B2* | 7/2020 | Olive ................. H04W 12/00 |
| 11,070,536 | B2* | 7/2021 | Olive ................. H04W 12/00 |
| 2005/0232428 | A1 | 10/2005 | Little et al. |
| 2006/0080451 | A1 | 4/2006 | Eckert |
| 2006/0130134 | A1 | 6/2006 | Colas |
| 2006/0249666 | A1 | 11/2006 | Kasevich et al. |
| 2007/0067620 | A1 | 3/2007 | Jevans |
| 2007/0195775 | A1 | 8/2007 | Glassoway |
| 2008/0005791 | A1 | 1/2008 | Gupta et al. |
| 2008/0044014 | A1 | 2/2008 | Corndorf |
| 2008/0044025 | A1 | 2/2008 | Corndorf |
| 2008/0046039 | A1 | 2/2008 | Corndorf |
| 2008/0073494 | A1 | 3/2008 | Hyodo |
| 2008/0130895 | A1 | 6/2008 | Jueneman et al. |
| 2009/0006926 | A1 | 1/2009 | Koppelaar et al. |
| 2010/0037311 | A1 | 2/2010 | He et al. |
| 2010/0185864 | A1 | 7/2010 | Gerdes, Jr. et al. |
| 2010/0199086 | A1 | 8/2010 | Kuang et al. |
| 2010/0262715 | A1 | 10/2010 | Tamalet et al. |
| 2011/0161248 | A1 | 6/2011 | Cai et al. |
| 2011/0255506 | A1 | 10/2011 | Toth et al. |
| 2011/0289003 | A1 | 11/2011 | Womack et al. |
| 2012/0177198 | A1 | 7/2012 | Cabos |
| 2012/0210783 | A1 | 8/2012 | Carroll et al. |
| 2012/0216286 | A1 | 8/2012 | Johnson et al. |
| 2012/0252493 | A1 | 10/2012 | Siddeley et al. |
| 2013/0073672 | A1 | 3/2013 | Ayed |
| 2013/0326214 | A1 | 12/2013 | McCanna et al. |
| 2014/0190254 | A1 | 7/2014 | Bouyer et al. |
| 2014/0241523 | A1 | 8/2014 | Kobres et al. |
| 2014/0365694 | A1 | 12/2014 | Bolton et al. |
| 2015/0005989 | A1 | 1/2015 | Beltrand |
| 2015/0023183 | A1 | 1/2015 | Ilsar et al. |
| 2015/0128207 | A1 | 5/2015 | Cabrera et al. |
| 2015/0312761 | A1 | 10/2015 | Subramanian et al. |
| 2015/0373154 | A1 | 12/2015 | Voigt et al. |
| 2016/0072781 | A1* | 3/2016 | Zhang .................. H04L 63/065 726/4 |
| 2016/0163202 | A1 | 6/2016 | Marion et al. |
| 2016/0183087 | A1 | 6/2016 | Lehtinen et al. |
| 2016/0212099 | A1 | 7/2016 | Zou et al. |
| 2016/0241389 | A1 | 8/2016 | Le Saint et al. |
| 2016/0277545 | A1 | 9/2016 | Kwak et al. |
| 2016/0286043 | A1 | 9/2016 | John et al. |
| 2016/0315766 | A1* | 10/2016 | Ujiie ................. H04L 9/083 |
| 2016/0337406 | A1 | 11/2016 | Lietz et al. |
| 2017/0046211 | A1 | 2/2017 | Jayawardena et al. |
| 2017/0111692 | A1 | 4/2017 | An et al. |
| 2017/0134164 | A1 | 5/2017 | Haga et al. |
| 2017/0295031 | A1 | 10/2017 | Bush et al. |
| 2017/0303123 | A1 | 10/2017 | Villar |
| 2017/0317975 | A1 | 11/2017 | Olive et al. |
| 2018/0006819 | A1 | 1/2018 | Watanabe et al. |
| 2018/0198846 | A1 | 7/2018 | Srinivasan et al. |
| 2019/0028448 | A1 | 1/2019 | Farrell |
| 2019/0095655 | A1 | 3/2019 | Krawczewicz et al. |
| 2019/0222986 | A1 | 7/2019 | Aitken et al. |
| 2019/0238638 | A1 | 8/2019 | Way et al. |
| 2019/0342275 | A1 | 11/2019 | Olive et al. |
| 2020/0304479 | A1 | 9/2020 | Olive et al. |

OTHER PUBLICATIONS

Kremer et al, "Public-Key-Infastructures for Embedded Systems", "Security for Invisible Systems", downloaded from the Internet prior to May 3, 2018, pp. 24-27.

Adams, "Securing ASCARS: Data Link in the Post-9/11 Environment", "Avionics Today", "http://www.aviationtoday.com/2006/06/01/securing-acars-data-link-in-the-post-911-environment/", Dated Jun. 1, 2006, Retrieved on Feb. 15, 2018, pp. 1-6, Publisher: Access Intelligence, LLC.

European Patent Office, "Communication pursuant to Article 94(3) from EP Application No. 17168567.0 dated May 17, 2019", from Foreign Counterpart to U.S. Appl. No. 15/498,415, pp. 1-6, Published: EP.

European Patent Office, "Communication pursuant to Article 94(3) from EP Application No. 17168567.0 dated Oct. 25, 2018", from Foreign Counterpart to U.S. Appl. No. 15/498,415, pp. 1-5, Published: EP.

European Patent Office, "Communication Pursuant to Article 94(3) from EP Application No. 17168567.0 dated Feb. 13, 2018", "from Foreign Counterpart of U.S. Appl. No. 15/498,415", Dated Feb. 13, 2018, pp. 1-5, Published in: EP.

European Patent Office, "Extended European Search Report from EP Application No. 17168567.0 dated Jul. 26, 2017", "from Foreign Counterpart of U.S. Appl. No. 15/498,415", Jul. 26, 2017, pp. 1-13, Published in: EP.

European Patent Office, "Extended European Search Report from EP Application No. 19172016.8 dated Jun. 4, 2019", from Foreign Counterpart to U.S. Appl. No. 15/970,521, pp. 1-11, Published: EP.

European Patent Office, "Extended European Search Report from EP Application No. 19172019.2 dated Jun. 3, 2019", from Foreign Counterpart to U.S. Appl. No. 15/970,522, pp. 1-11, Published: EP.

Kremer et al, "Public-Key-Infastructures for Embedded Systems", "Security for Invisible Systems", pp. 24-27.

Mahmoud et al, "An Aeronautical Data Link Security Architecture Overview", "28th Digital Avionics Systems Conference Oct. 25-29, 2009, Orlando, US", "HAL Archives—ouvertes", "https://hal-enac.archives-ouvertes.fr/hal-01022165", Dated Sep. 9, 2014, pp. Cover, 4.A.4-1-4.A.4-14, Publisher: IEEE.

Olive, "ACARS Message Security (AMS) as a Vehicle for Validation of ICAO Doc. 9880 Part IV-B Security Requirements", Jun. 2-May 2009, pp. 1-12, Publisher: Honeywell.

Olive, "Efficient Datalink Security in a Bandwidth-Limited Mobile Environment—An Overview of the Aeronautical Telecommunications Network (ATN) Security Concept", Dated 2001, pp. 9.E.2-1-9.E.2-10, Publisher: IEEE.

Pasco, "ACARS and Error Checking", Technology, IFEC & IT, Dec. 6, 2015, pp. 1-5, Flight.

Rodriguez-Flores et al, "Compact FPGA Hardware Architecture for Public Key Encryption in Embedded Devices", "PLOS ONE", "https://doi.org/10.1371/journal.pone.0190939", Dated Jan. 23, 2018, pp. 1-21, Publisher: 2018 Rodriguez-Flores et al.

(56) References Cited

OTHER PUBLICATIONS

Rushby, "Partitioning in Avionics Architectures: Requirements, Mechanisms, and Assurance", "Retrieved from the Internet: http://www.tc.faa.gov/its/worldpac/techrpt/ar99-58.pdf; retrieved on Jun. 9, 2010", Mar. 2000, pp. 1-68.

Salisbury, "Protected ACARS (PACARS)", "Baltic Management Directorate, Aerospace Management Systems Division", CNS/ATM Conference 2011, Dated 2011, pp. 1-35, Publisher: The MITRE Corporation.

Smith, et al, "Economy Class Crypto: Exploring Weak Cipher Usage in Avionic Communications via ACARS", 21st International Conference on Financial Cryptography and Data Security, Malta, 2017, pp. 1-18.

Strohmeier, "University of Oxford, Kellogg College, Thesis, "Security in Next Generation Air Traffic Communication Networks"", Dated 2006, pp. 1-204.

U.S. Patent and Trademark Office, "Advisory Action", U.S. Appl. No. 15/498,415, dated Feb. 12, 2020, pp. 1-3, Published: US.

U.S. Patent and Trademark Office, "Final Office Action", U.S. Appl. No. 15/498,415, dated Dec. 6, 2019, pp. 1-20, Published: US.

U.S. Patent and Trademark Office, "Notice of Allowance", U.S. Appl. No. 15/970,521, dated Mar. 19, 2020, pp. 1-31, Published: US.

U.S. Patent and Trademark Office, "Notice of Allowance", U.S. Appl. No. 15/970,522, dated Aug. 20, 2020, pp. 1 through 7, Published: US.

U.S. Patent and Trademark Office, "Office Action", U.S. Appl. No. 15/498,415, dated Feb. 26, 2019, pp. 1-45, Published: US.

U.S. Patent and Trademark Office, "Office Action", U.S. Appl. No. 15/498,415, dated Mar. 17, 2020, pp. 1-19, Published: US.

U.S. Patent and Trademark Office, "Office Action", U.S. Appl. No. 15/498,415, dated Aug. 21, 2019, pp. 1-35, Published: US.

U.S. Patent and Trademark Office, "Office Action", U.S. Appl. No. 15/970,522, dated Jul. 21, 2020, pp. 1 through 45, Published: US.

U.S. Patent and Trademark Office, "Restriction Requirement", U.S. Appl. No. 15/970,522, dated Jun. 15, 2020, pp. 1 through 6, Published: US.

European Patent Office, "Communication pursuant to Article 94(3) EPC from EP Application No. 19172019.2", from Foreign Counterpart to U.S. Appl. No. 19172019.2, from Foreign Counterpart to U.S. Appl. No. 15/970,522, dated Dec. 23, 2020, pp. 1 through 4, Published: US.

National Intellectual Property Administration, P.R. China, "First Office Action from CN Application No. 201910326994.9", from Foreign Counterpart to U.S. Appl. No. 15/970,522, dated Dec. 30, 2020, pp. 1 through 12, Published: CN.

\* cited by examiner

SYSTEMS AND METHODS FOR ENCRYPTED VEHICLE DATA SERVICE EXCHANGES

CROSS-REFERENCE TO RELATED APPLICATIONS

This U.S. patent application is a divisional application of U.S. patent application Ser. No. 15/970,552, titled "SYSTEMS AND METHODS FOR ENCRYPTED VEHICLE DATA SERVICE EXCHANGES", filed on May 3, 2018, which is hereby incorporated by reference in its entirety.

BACKGROUND

Operators of commercial vehicles, such as aircraft, trains and ships, have an increasing interest in leveraging broadband IP-based datalinks to communicate operations information between the vehicles and their off-vehicle data management systems. This is in part because routing data through broadband IP-based datalinks tends to provide higher bandwidth and more cost-effective options as compared to traditional datalinks routed through Datalink Service Providers (DSPs). A problem that comes with broadband IP-based datalinks, however, is that communications between the vehicle and the off-vehicle data management systems becomes susceptible to malicious interference from other traffic sharing the same IP network (such as the public Internet for example). For example, messages spoofing the operator's central information management systems may be received by the vehicle from other users of the network, or even by passengers on the vehicle who are utilizing IP communications and entertainment services offer to passengers. Even if not manipulated, such communication exchanges could be monitored to obtain sensitive data not intended for public knowledge. In many instances, it is paramount that the on-vehicle communications functions are able to securely exchange communications with the off-vehicle data management systems ensure the safe and efficient operation of the vehicle.

One approach know in the art is to distribute certificates so that on-vehicle communications functions can authenticate and encrypt messages they exchange with off-vehicle data management systems. Certificates would permit the on-vehicle communications functions to sign and encrypt messages it sends and to review the certificates of messages it receives to determine their authenticity. One problem that exist with the certificate approach is the ongoing need to renew certificates stored on in the on-vehicle communications functions when they expire. Another is the need to reload a valid certificate when equipment is replaced during maintenance. For example in the case of a commercial aircraft, the aircraft operator may need to quickly pull out an avionics device and replace that unit between flights. New and valid certificates would need to be loaded onto the avionics device to enable to sign downlink messages and authenticate uplink message. A certificate system would therefore increase the time necessary to perform that replacement, which can delay departure schedules. Symmetric key schemes, which do not rely on certificates, and traditional certificate-based asymmetric key schemes are known, but these systems as they exists today also present problems. Specifically, they both force on the on-vehicle communications function the need to protect either the symmetric key, or the private key of a public/private asymmetric key pair, from disclosure to maintain communications integrity, which can increase the cost and complexity of the on-board equipment in order for it to provide the needed security.

For the reasons stated above and for other reasons stated below which will become apparent to those skilled in the art upon reading and understanding the specification, there is a need in the art for systems and methods for encrypted vehicle data service exchanges.

SUMMARY

The Embodiments of the present disclosure provide methods and systems for encrypted vehicle data service exchanges and will be understood by reading and studying the following specification.

In one embodiment, a vehicle communication manager device located onboard a vehicle comprises a memory comprising a non-volatile memory device storing a fixed embedded public key, wherein the embedded public key is a public key of a public-private key pair associated with a data service system not onboard the vehicle; a processor in communication with a wireless datalink transceiver; a vehicle data service protocol executed by the processor, wherein the vehicle data service protocol initiates a communication session for data service exchanges with the data service system via the wireless datalink transceiver; wherein the vehicle data service protocol causes the processor to: transmit a session request message to the data service system, and receive a session reply message from the data service system in response to the session request message, wherein the session reply message indicates if the vehicle communication manager is authorized for encrypted data service exchanges, and wherein the processor is configured to validate an authenticity of the session reply message using the embedded public key; determine whether to enable message encryption if the session reply message indicates that the vehicle communication manager is authorized for encrypted data service exchanges, and transmit an initialization request message to the data service system that includes an indication of whether message encryption is elected; generate a key derivation key and transmit the key derivation key to the data service system, wherein the key derivation key is encrypted within the initialization request message using a public operational encryption key received in the session reply message; receive an initiation response message from the data service system that includes an indication confirming whether message encryption is elected; when the initiation response message confirms that message encryption is elected generate at least one Message Encryption Key (MEK) by applying the key derivation key to a key derivation function; encrypt data service downlink messages transmitted to a host data service of the data service system using the at least one message encryption key, and decrypt data service uplink messages received from the host data service using the at least one message encryption key.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments described herein are based on a hybrid symmetric and public-private key system that utilizes an embedded public key in lieu of a public key certificate approach. Moreover, any need to store associated device private keys on the vehicle is eliminated.

Figure 1:
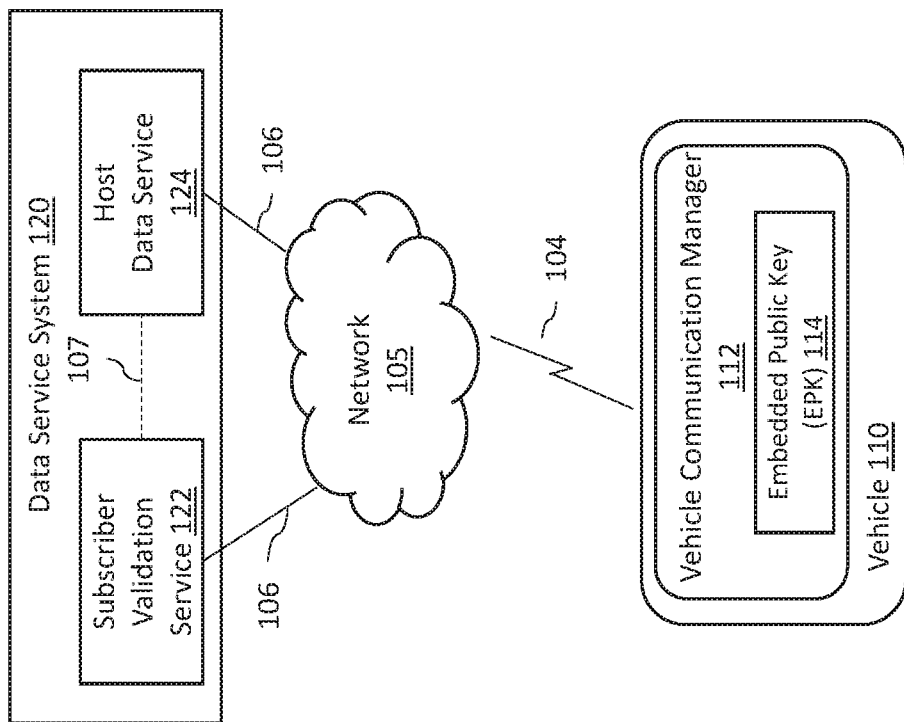
FIG. 1 is a diagram illustrating a vehicle data service system of one embodiment of the present disclosure

FIG. 1 is a diagram illustrating a vehicle diagram illustrating a vehicle data service system 100 of one embodiment of the present disclosure. As shown in FIG. 1, vehicle data service system 100 includes a data service system 120 and at least one vehicle 110 that subscribes to data services offered by the data service system 120. Vehicle 110 is not limited to any one type of vehicle, but in alternate embodiments may comprise, for example, any form of automobile, truck, train, aircraft, spacecraft, or water vessel. Data service system 120 may comprise one or more network nodes, servers, data storage devices with databases and/or other devices configured to provide one or more vehicles, such as vehicle 110, with data such as but not limited to travel advisories, weather information, passenger and/or cargo manifests, gate and/or terminal information, destination and routing information and schedules, clearances, maintenance data, passenger entertainment, and/or public Internet connectivity. In some implementations, vehicle 110 comprises an aircraft and data service system 120 provides Aircraft Communications Addressing and Reporting System (ACARS) data services, which may be hosted, for example, by a government agency, an airline's operations department, or as a third-party subscription service.

In the embodiment shown in FIG. 1, the data service system 120 comprises two primary components, a subscriber validation service 122 and at least one host data service 124. As explained in greater detail below, the host data service 124 comprises one or more servers that operate to provide vehicle 110 with the data described above through the exchange of uplink (UL) and downlink (DL) data service messages. In some embodiments, the data service system 120 may comprise multiple host data services 124. For example, in some embodiments, two independent host data service 120 elements within the same data service system 120 may be utilized to provide load balance or to implements a secondary host data service 124 that acts as backup for a primary host data service 124. In other embodiments, data service system 120 may include access to multiple host data services 124 separated from subscriber validation service 122, with each host data services 124 applicable to different fleet operators or airlines, for example. It should be noted that regardless of how many host data service 124 instances are accessible through the data service system 120, vehicle 110 will need to go through the subscriber validation service 122 first, before being granted access to any host data service 124.

The subscriber validation service 122 functions to authenticate that vehicle 110 is authorized to access the services of the host data service 124, and provides the vehicle 110 with a set of public operational keys that are used for establishing communications with the host data service 124. As explained below, with embodiments of the present disclosure, the vehicle 110 need only ever store the public key of any public-private key pair, alleviating vehicle 110 of the complexities and/or expensive hardware needed to store private keys and the risks of having such private keys extracted from vehicle hardware by unscrupulous actors.

In some embodiments, the subscriber validations service 122 and host data service 124 may be integrated together as a single computing system and/or network operated by a single system operator. In other embodiments, the subscriber validation service 122 may operate with one or more separate host data services 124 hosted on networks independent of those used for the subscriber validation service 122. For example, access to data service providers may be offered as a service by the operator of the subscriber validation service 122 while the actual relevant data and servers to provide that data resides with the host data service 124. For embodiments where the subscriber validation service 122 and host data service 124 are not physically integrated as a single system, they may be communicatively connected by a proprietary communications link 107 between the two services. Alternatively, the subscriber validation service 122 and host data service 124 may each comprise network connections 106 with a network 105 (which may comprise an Internet Protocol (IP) network such as but not limited to the public Internet, for example) and communicate through network 105 via the network connections 106. It should be noted that for still other implementations that include multiple available host data services 124, one or more of those available host data service 124 may be integrated with the subscriber validations service 122, while one or more other host data service 124 may be hosted on by operators on networks independent of those used for the subscriber validation service 122.

As shown in FIG. 1, the vehicle 110 establishes a wireless connection 104 with the network 105 through which it communicates to access the services of the data service system 120. The wireless connection 104 may be established using any applicable form of wireless connectivity including, but not limited to, IEEE 802.11 (WiFi), cellular communications, optical communications, or other radio and/or satellite communications. Onboard vehicle 110, a vehicle communications manager 112 comprises the functionality to implement protocols, described below, for establishing communications between the vehicle 110 and the data service system 120. For example, vehicle communications manager 112 may execute an Internet Protocol (IP) stack for exchanging messages and packets with the network 105. In some embodiments, the vehicle communications manager 112 may be implemented as one or more specialized hardware components onboard the vehicle. In other embodiments, some or all of the functions attributed to the vehicle communications manager 112 may be virtualized or otherwise executed or performed by other onboard vehicle components. As shown in FIG. 1, at least one component of the vehicle communications manager 112 stores an embedded public key (EPK) 114 with which it may authenticate messages from the subscriber validation service 122. For example, the EPK may be either hardcoded or otherwise embedded in a non-volatile memory storage device such as firmware, EPROM, non-volatile memory, or other non-volatile hardware components of the vehicle communications manager 112, for example. As the term is used herein, a non-volatile memory storage device may comprise any long-term persistent storage hardware that maintains saved data even when power is removed.

There is no need for vehicle communications manager 112 to hold its own private key, or otherwise store public key infrastructure (PKI) digital certificates in order to utilize the EPK 114. As such, EPK 114 is referred to herein as a self-reliant public key as it is a public key reliant on own authenticity and ability to authenticate messages from the subscriber validation service without the need for further resources beyond the EPK 114 itself. Moreover, as further explained below, the vehicle communications manager 112 in the embodiments described herein, never needs to obtain possession of any PKI private key in order to establish bidirectional authenticated communications with the data service system 120.

Figure 2:
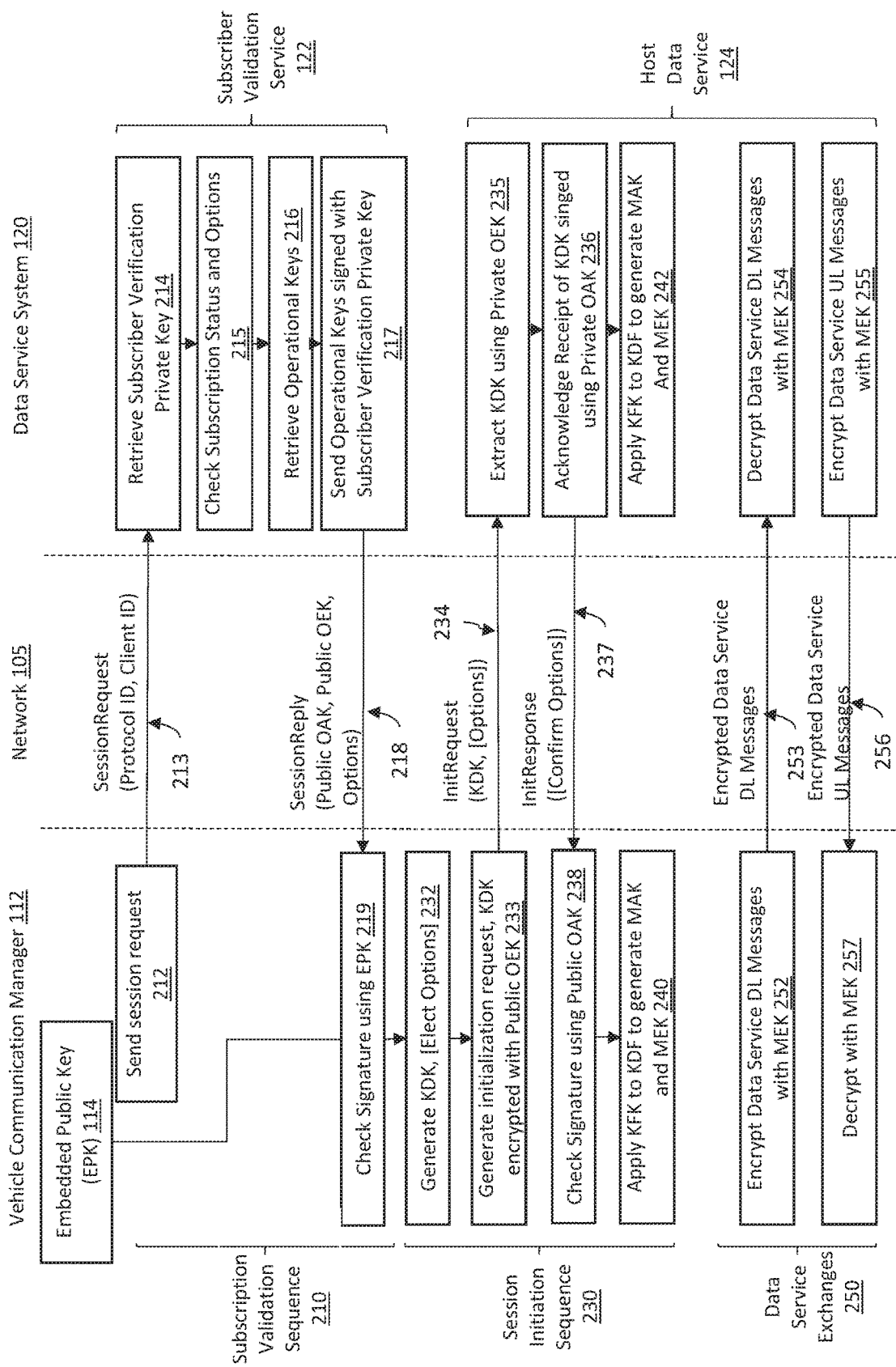
FIGS. 2, 2A and 2B are process flow diagrams illustrating a process for establishing encrypted communications between a vehicle communication manager and a data service system as shown in FIG. 1 using an embedded public key.

FIG. 2 is a process flow diagram illustrating the process of establishing authenticated and encrypted communications between the vehicle communication manager 112 and the data service system 120 using the EPK 114. The fixed EPK 114 is utilized to setup a secure encrypted connection between the vehicle 112 and data service system 120 through distinct message exchange sequences which comprise a subscriber validation sequence 210 and a session initiation sequence 230. Successful completion of the subscriber validation sequence 210 and the session initiation sequence 230 leads to the ability to perform data service exchanges 250. It should be understood that in the process illustrated in FIG. 2, the same EPK 114 may be embedded within and used across multiple vehicles on an operator's vehicle fleet. That is, the EPK 114 may be set at the equipment factory so that equipment spare parts received and/or warehoused by the vehicle operator will already have the necessary key pre-installed EPK 114 for performing the exchange shown in FIG. 2. It should also be noted that the pre-installed EPK 114 may be refreshed during periodic vehicle upgrades to mitigate the risk of compromised associated private keys. As will be described in greater detail below, the embedded EPK is used to initiate the communications session. Once initiated, the subscriber validation service 122 will deliver a set of operational keys to the vehicle communication manager 112 in the subscriber validation sequence 210. During the session initiation sequence 230, the vehicle communication manager 112 and the host data service 124 will exchange information in order to each independently generate a shared message authentication and encryption keys that are known to both, unique to that communication session, and which may be used to authenticate and encrypt the exchange of uplink (UL) and downlink (DL) data service messages.

The subscription validation sequence 210 begins at 212 where the vehicle communications manager 112 transmits a session request message 213 to the subscriber validation service 122 of the data service system 120. As shown in FIG. 2, the session request message 213 comprises at least a protocol ID associated with the EPK 114 and a Client ID. The protocol ID indicates to the subscriber validation service 122 which version of the EPK 114 the vehicle communication manager 112 is using. That is, while the same EPK 114 may be used across multiple vehicles, it is also true that different sets of vehicle may operate using different EPKs. For example a firmware update to upgrade a vehicle communication manger 112 may also update the EPK 114 embedded in that vehicle communication manger 112. As such, an operator's fleet may comprise some vehicles where the firmware update has been performed, and others where the firmware update has not been performed. The protocol ID thus indicates which EPK 114 the vehicle has so that the subscriber validation service 122 may access the correct associated private key that corresponds to the EPK 114. The Client ID, may be used to identify the operator of the vehicle 110, or otherwise the holder of the subscription to the data service that vehicle 110 operates under. For example, where the data service system 120 offers services to multiple operators (for example, different airlines) the Client ID will identify said operator of vehicle 110.

The subscriber validation service 122 will securely store a respective private key, referred to herein as a "subscriber verification private key", for each valid EPK which it recognizes as valid. For example, based on the protocol ID in the session request 213, the subscriber validation service 122 will retrieve and/or identify the subscriber verification private key associated with the EPK 114 as shown at 214. The subscriber validation service 122 will validate the current subscription status, as shown at 215, to authenticate that the session request 213 has been received by an authorized user of the data service system 120. For example, if the operator's subscription is suspended, the subscriber validation service 122 may decline to grant access, even if the EPK 114 is otherwise a valid key. In some embodiments, the subscriber validation service 122 may have access to a database or other data server in order to compare the Protocol ID and/or Client ID received with a listing of active subscriptions and determine whether the subscription held by the vehicle's operator includes encryption services. The subscriber validation service 122 can also at this point determine if the subscription further includes one or more optional services such a data compression, for example.

Once the subscription and availability of the encryption option is confirmed at 215, the sequence 210 continues to 216 where the subscriber validation service 122 retrieves a set of public operational keys associated with the host data service 124 for which the vehicle 110 holds a valid subscription. The set of public operational keys includes a public operational authentication key (OAK) and a public operational encryption key (OEK). In some embodiments, the public OAK and OEK are generated and provided by the host data service 124 to the subscriber validation service 122. The subscriber validation service 122 then generates and sends a session reply message 218 back to the vehicle communication manager 112. The session reply message 218 includes the public OAK and OEK and an indication of whether encryption service is authorized for the vehicle communication manager 112, and is signed by the Subscriber Verification Private Key. For embodiments where the subscriber validation service 122 and host data service 124 are not integrated, the session reply message 218 may further include a network address for the host data service 124. In one such embodiment, the network address for the host data service 124 may be based on subscription status information associated with the Protocol ID and/or Client ID.

It should be noted that the vehicle communication manager 112 again does not receive, and thus has no reason to be configured to store, any private keys associated with the public OAK and OEK. Moreover, because the session reply message 218 is signed using the Subscriber Verification Private Key that corresponds to the EPK 114, the vehicle communication manager 112 may authenticate that the session reply message 218 is being received from a valid source as shown at 219.

Once the vehicle communication manager 112 receives the public OAK and OEK, the subscription validation sequence 210 is complete, and the session initiation sequence 230 may commence. The session initiation sequence 230 begins at 232 with the vehicle communication manager 112 generating a Key Derivation Key (KDK) onboard the vehicle 110. The vehicle communication manager 112 may also at this point determine whether to enable message encryption, based on whether it supports the capability and whether it is authorized per the session reply message 218. The KDK is encrypted using the public OEK. An initialization request message 234 is generated by the vehicle communication manager 112 which includes the encrypted KDK and optionally an indication of whether message encryption is elected. The initialization request message 234 is transmitted to the host data service 124. In some embodiments where the host data service 124 and subscriber validation service 122 are integrated, the initialization request message 234 may be transmitted back to the same network address that the session request 213 was transmitted to. In other embodiments where the host data service 124 and subscriber validation service 122 are not integrated, the initialization request message 234 may be transmitted to the network address indicated by the subscriber validation service 122 in the session reply message 218. The host data service 124, upon receiving the initialization request message 234 will decrypt the KDK using a private OEK corresponding to the public OEK, extract the KDK, and identify the election of an optional services, if applicable. At 236, the host data service 124 may then acknowledge receipt of the KDK by sending back to the vehicle communication manager 112 an initialization response message 237. The initialization response message may further confirm the election of optional services. The initialization response message 237 is signed by the host data service 124 using the private OAK so that when the vehicle communication manager 112 received the initialization response message 237, it may use the public OAK it received to validate that the initialization response message 237 is being received from a valid source as shown at 238.

At this point in the session initialization sequence 230, the vehicle communication manger 112 and the host data service 124 will both be in possession of a shared item of information, the KDK, that was initially generated on-board the vehicle at the beginning of the session initialization sequence 230. From this point, the vehicle communication manager 112 and host data service 124 will each independently generate a set of matching symmetric keys, referred to herein as the Message Authentication Key (MAK) and Message Encryption Key (MEK). More specifically, the vehicle communication manager 112 applies the KDK to a key derivation function (KDF) in order to generate a local copy of the Message Authentication Key (MAK) and Message Encryption Key (MEK) as shown at 240. Note that the MEK would not be generated if the encryption option is not authorized, elected, and confirmed via the session reply, initialization request, and initialization response messages, as discussed above.

The MAK and MEK generated onboard the vehicle 110 are each locally stored by the vehicle communication manager 112. The host data service 124, as shown at 242, also applies the KDK to the same KDF in order to generate an identical set of the Message Authentication Key (MAK) and Message Encryption Key (MEK), which are locally stored by the host data service 124. As such, the host data service 124 and vehicle communication manager 112 will complete the session initiation sequence 230 both in possession of the same MAK and MEK without ever having to transmit the MAK or MEK through the Network 105. In some embodiments, in addition to inputting the KDK, the KDF may further input additional data known to both the host data service 124 and vehicle communication manager 112 as seed data for generating the MAK and MEK. For example, in some embodiments, the KDF may input as additional seed data one or more parameters such as, but not limited to, a timestamp of the initialization request message 234, a timestamp of the initialization response message 237, the signature applied to the initialization response message 237, and/or the network address of the host data service 124. Inclusion of the timestamps of the initialization request message 234 and initialization response message 237 has the advantage of protecting against capture and replay attacks. For example, messages may be considered valid for only limited durations of time and alteration of timestamps will invalidate the signatures applied to those messages. In some embodiments, the MEK may comprise a first message encryption key associated with data service uplink messages and a second message encryption key, different from the first message encryption key, associated with data service downlink messages.

Upon completion of the session initiation sequence, the vehicle communication manger 112 and the host data service 124 will both be in possession of shared MEK and MAK, and encrypted data service exchanges may begin as shown in 250 to send information back and forth. For the remainder of this session, the vehicle communication manager 112 may use the MEK to encrypt data service DL messages 253 (as shown at 252) and the host data service 124 may decrypt and extract received data service DL messages 253 using its copy of the same MEK (as shown at 254). Similarly, the host data service 124 may encrypt data service UL messages 256 (as shown at 255) and the vehicle communication manager 112 may decrypt and extract receive data service UL messages 256 using the MEK (as shown at 257). In some embodiments, the encryption algorithms used to encrypt the data service UL and DL messages may be a symmetric block or steam cipher that uses the MEK to transform plaintext into ciphertext. Such a symmetric cyrypto-algorithm may be executed very quickly so that the encryption process does not produce any significant latency issues.

The entire process to arrive at the shared MAK and MEK keys is achieved without the need to ever store a private key onboard the vehicle 110 but still provide bidirectional authenticity, security and encryption. The subscriber validation service 122 and host data service 124 may be integrated, or alternatively separate and provided by different entities and hardware. Moreover, the MAK and MEK are valid for the length of a single communications session. Once a connection is lost, the session ends the MAK and MEK become void.

Figure 2A:
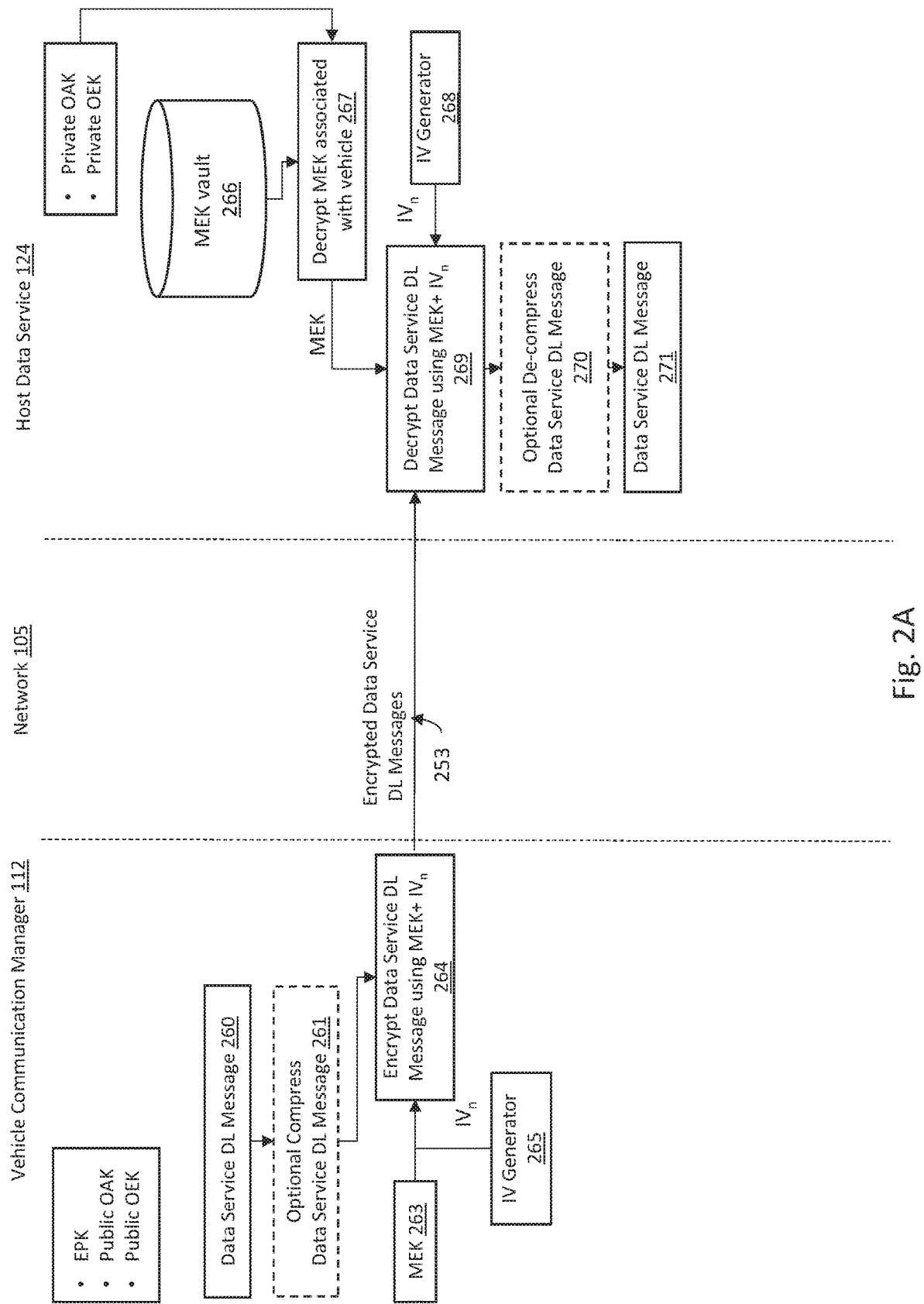

FIG. 2A is a process flow diagram illustrating a process of data service downlink message encryption during the data service exchanges 250 for one embodiment of the present disclosure. As shown at 260, an application executed by an on-board processing resource generates a data service DL message. For example, in one embodiment, the application may comprise an ACARS application executed by an aircraft's Communication Management Unit. The data service DL message may comprise a request to obtain information from the host data service 124, or alternately a reply to provide information to the host data service 124. In some embodiments, if an optional service such as data compression is available, the vehicle communication manager 112 may apply that service to the data service DL message as shown at 261.

While in some embodiments encryption may be performed simply by applying the MEK to the message payload, in other embodiments, in order to further strengthen the encryption applied to a data service UL or DL message, the MEK is used in combination with an Initialization Vector (IV). In one such embodiments, the data service DL message is encrypted at 264 as a function of the MEK 263 and an IV produced by an IV generator 265. The IV generator 265 produces a periodically changing arbitrary number, An IV value that is output by the IV generator 265 is used along with the MEK in order to perform the data encryption. As discussed further below, an IV generator 268 located at the host data service 124 is programed to produce an identical IV as the IV generator 265 at any given point in time. Thus, the IV at any one point in time comprises a value that is simultaneously known to both the vehicle communication manager 122 and the host data service 124. In some embodiments, the IV may be valid for only a given length of time after a data service DL message is encrypted. As such, even though a non-varying constant MEK 263 is used for the duration of the communications session, the current IV used in conjunction with the MEK 263 may change between messages. After encryption is performed, the encrypted data service DL message 253 is transmitted across the network 105 to the network address of the host data service 124.

At the host data service 124 the MEK associated with vehicle 110 is stored in an MEK vault 266 within which the MEK for a specific vehicle 110 is kept encrypted using the private OEK associated with that vehicle 110. It should be understood that since the Host Data Service 124 may have multiple communication sessions established with multiple different vehicles, each vehicle's unique MEK will be securely stored in the MEK vault 266 and encrypted using the private OEK associated with each respective vehicle. When the encrypted data service DL message 253 is received at the host data service 124, the appropriate MEK is retrieved from the MEK vault 266 and decrypted using the private OEK as shown at 267. The data service downlink (DL) message is then decrypted at 269 as a function of the just decrypted MEK and an Initialization Vector (IV) produced by an IV generator 268. The Host Data Service's IV generator 268 is programed so that it will compute an IV value matching the IV value generated by the onboard IV generator 265. As such the MEK and IV value used to encrypt the data service DL message at 264 will be the same MEK and IV value applied at 269 to decrypt the data service DL message at 269 and recover the data service DL message at 271. For embodiments where optional services such as compression were applied at 261, then the corresponding recovery service, such as decompression, can be applied at 270 to arrive at the original data service DL message at 271.

Figure 2B:
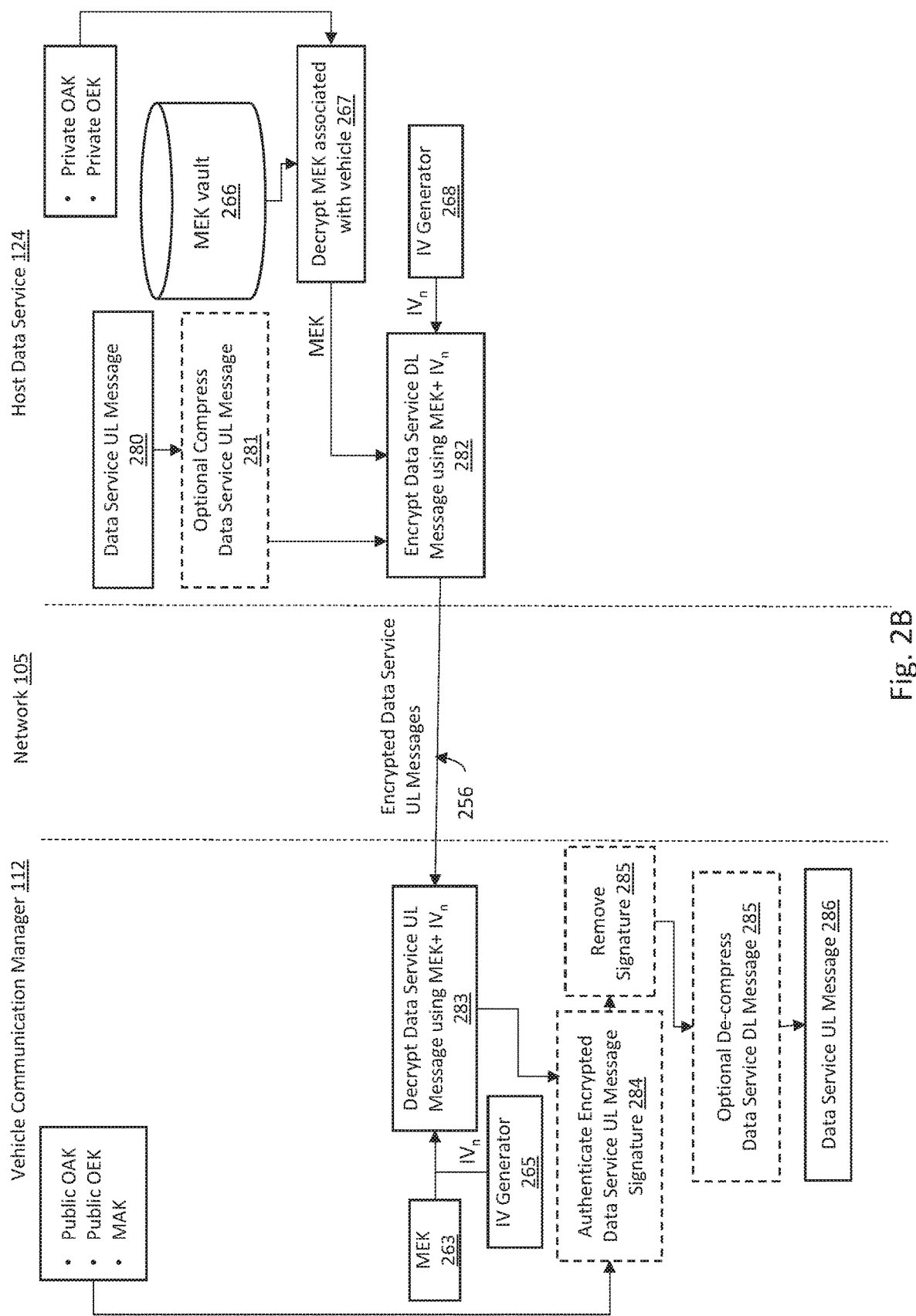

FIG. 2B is a process flow diagram illustrating a process of data service uplink message encryption during the data service exchanges 250 for one embodiment of the present disclosure. As shown at 280, an application executed by the host data service 124 generates a data service UL message. For example, in one embodiment, the application may comprise an ACARS application. The data service UL message may comprise a request to obtain information from an application on the vehicle 110, or alternately a reply to provide information to an application on the vehicle 110. In some embodiments, if an optional service such as data compression is available, the host data service 124 may apply that service to the data service UL message as shown at 281.

Once the encrypted data service UL message 253 is generated and available at the host data service 124, the appropriate MEK associated with the vehicle 110 is retrieved from the MEK vault 266 and decrypted using the private OEK as shown at 267. The data service UL message is then encrypted at 282 as a function of the MEK and an Initialization Vector (IV) produced by IV generator 268. The encrypted data service UL message 256 may then be transmitted across the network 105 to the vehicle communication manager 112. As with the downlink process described in FIG. 2A, for uplink messages, the host data service's IV generator 268 is programed so that it will compute an IV value matching the IV value generated by the onboard IV generator 265. As such the MEK and IV value used to encrypt the data service UL message at 282 will be the same MEK and IV value applied to decrypt the data service UL message at the Vehicle Communication Manager 112.

When the encrypted data service UL message 253 is received at the vehicle communication manager, the MEK 263 stored on-board the vehicle and the locally generated IV are applied to decrypt the Data Service UL message as shown at 283. In some embodiments, the encrypted data service UL message 256 is further protected by the host data service 124 using the MAK, or signed using the private OAK or the MAK. In such embodiments, the data service UL message may be authenticated at 284 (using the associated public OAK or MEK stored onboard vehicle 110) and then the signature subsequently removed at 285. For embodiments where optional services such as compression were applied at 281, then the corresponding recovery service, such as decompression, can be applied at 285 to arrive at the original data service UL message at 286.

It should be understood that there are a number of ways in which the IV generators 265 and 268 may be programed in order to compute matching IV values. For example, in some embodiments, IV data may be computed as:

$$IV_{data}=(DIR\|VALUE\|PAD)$$

where DIR has a first value (e.g. 0x00) for DL messages and a second value (e.g. 0x01) for UL messages, VALUE is a changing value simultaneously known to both IV generators 265 and 268, and PAD comprising one or more padding bits (for example, to bring the IVdata to a predetermined set bit length such as 128 bits in length). In some embodiments, an $IV_n$ value may be computed as:

$$IV_n=E(KEY,IV_{data};DATA)$$

where the function E( ) comprises an encryption function comprising an encryption algorithm such as, but not limited to AES128-CFB128 encryption and DATA is a padding of zeros, such as 128 bits of binary zeros. In that case, the resulting $IV_n$ is 128 bits in length and may be used for the encryption and decryption processes. In other embodiments, 256 bits may be used, resulting in an $IV_n$ that is 256 in length and may be used for the encryption and decryption processes. In still other embodiments, other bit lengths may be used. The encryption of a data service UL or DL message may then be calculated as:

Encrypted Data Service Message=$E$(KEY,IV;Data Service Message)

Similarly, the decryption of an encrypted data service UL or DL message may then be calculated as:

Data Service Message=$E$(KEY,IV;Encrypted Data Service Message)

Figure 3:
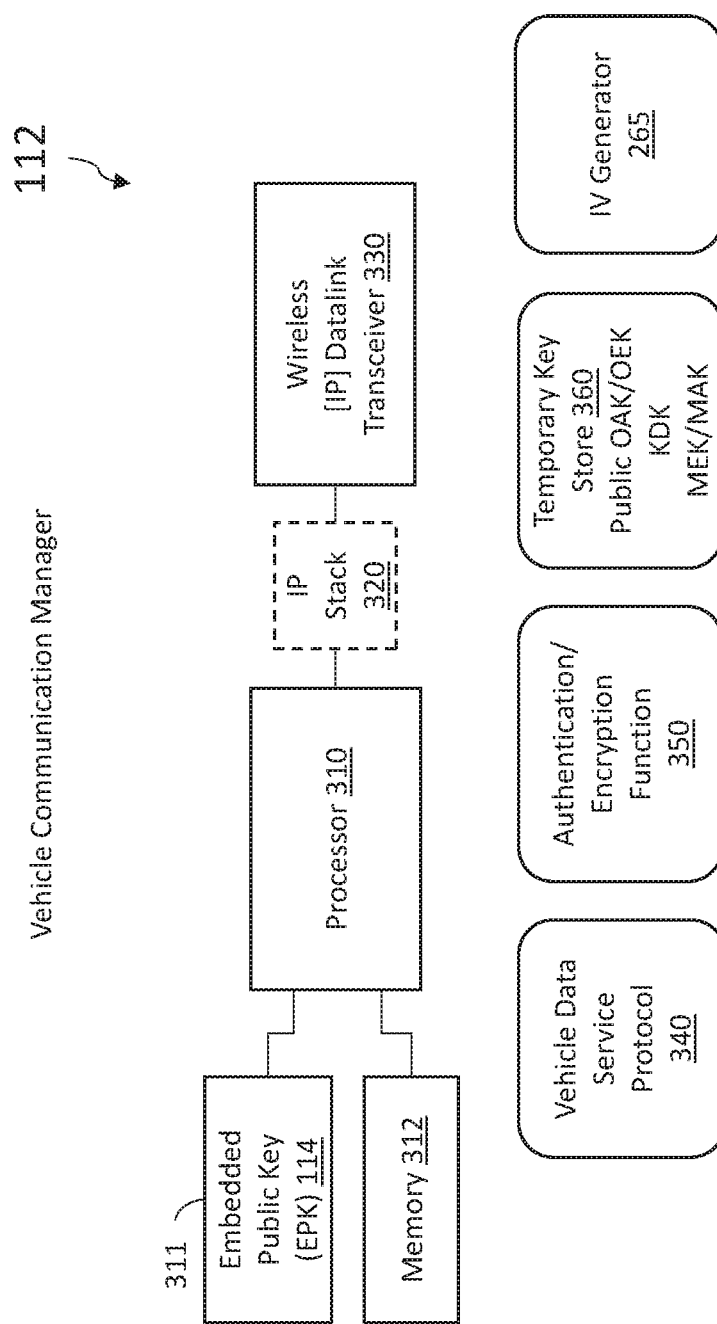
FIG. 3 is a block diagram illustrating a vehicle communication manager as shown in FIG. 1 of one embodiment of the present disclosure.

FIG. 3 is a block diagram illustrating a vehicle communication manager 112 of one embodiment of the present disclosure. As discussed above, in some embodiments, the elements of the vehicle communication manager 112 may be implemented using discrete hardware components. In other embodiments, one or more the elements of the vehicle communication manager 112 may be virtualized and executed by processing hardware onboard the vehicle 110. For example, where the vehicle 110 comprises an aircraft, the vehicle communication manager 112 described herein may be realized within either a communications management unit (CMU) device installed on the aircraft, or within a communications management function (CMF) executed via onboard processing hardware.

In the embodiment shown in FIG. 3, the vehicle communication manager 112 comprises a processor 310 coupled to a memory 312 and programed to execute code to perform the functions of the vehicle communication manager described in this disclosure. The processor 310 has access to a data storage hardware device 311 in which the EPK 114 is embedded. The processor is coupled to at least one wireless datalink transceiver 330 through which wireless communication links 104 with the network 105 are established. For embodiments where the network 105 comprises an IP network, the vehicle communication manager 112 comprises an IP stack 320 through which communications traffic via links 104 are transmitted and received by the vehicle communication manager 112 are processed. In one embodiment, the vehicle communication manager 112 further comprises a vehicle data service protocol 340 which may be stored in the memory 312 and executed by the processor 310 to carry out the subscription validation sequence 210, session initiation sequence 230 and data service exchanges 250 attributed to the vehicle communication manager 112. The vehicle communication manager 112 may further comprise at least one authentication and encryption function 350 stored in the memory 312 and executed by the processor 310 to carry out the message signing, authentication, encryption, and decryption processes for carrying out the subscription validation sequence 210, session initiation sequence 230 and data service exchanges 250. Moreover, as shown in FIG. 3, the vehicle communication manager 112 further comprises a temporary key store 360 (which may be within memory 312) for storing the public OAK and OEK, the KDK, and the MEK and MAK keys used through-out the subscription validation sequence 210, session initiation sequence 230 and data service exchanges 250. While the EPK 114 remains embedded within the vehicle communication manager for long term use, the keys stored in the key store may be discarded after a data service session is completed.

Figure 4:
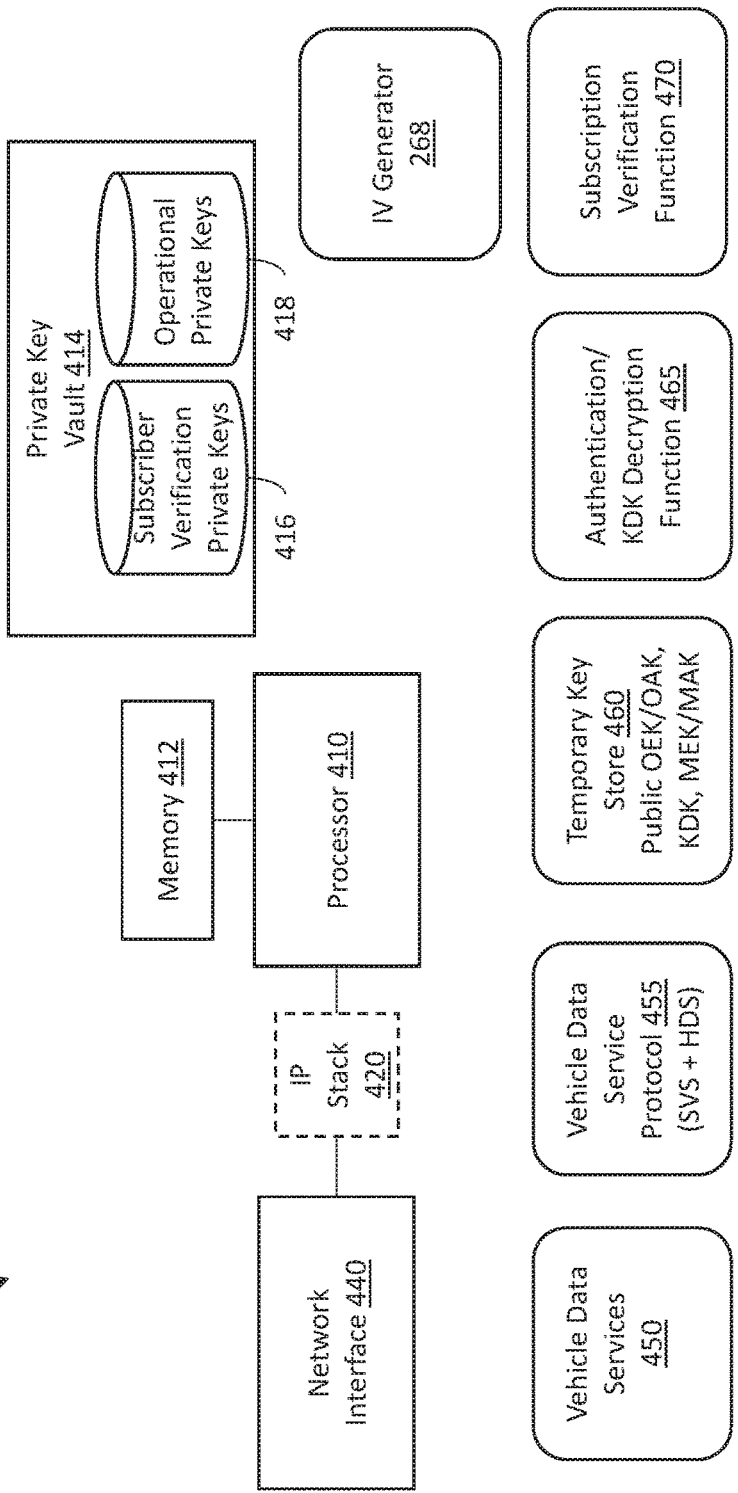
FIG. 4 is a block diagram illustrating an integrated data service system for a vehicle data service system of one embodiment of the present disclosure.

FIG. 4 is a block diagram illustrating a data service system 120 of one embodiment of the present disclosure where the subscriber validation service 122 and host data service 124 comprise an integrated implementation. That is, in this embodiment, the subscription service provider and the provider hosting the endpoint vehicle data services servers are the same.

In the embodiment shown in FIG. 4, the data service system 120 comprises a processor 410 coupled to a memory 412 and programed to execute code to perform the functions of the data service system 120 described in this disclosure. The processor 410 has access to a private key vault 414 in which the subscriber verification private keys 416 are securely stored. In embodiments, the private key vault 414 comprises a secure hardware device vault or chip comprising protection mechanisms designed to store private keys in an encrypted format.

In one embodiment, when a message needs to be encrypted, decrypted, signed or authenticated using a private key, the message is sent to the private key vault 414 and processed internally by the private key vault 414 which then generates an output that is encrypted, decrypted, signed or authenticated using the appropriate private key. In one embodiment, the private key vault 414 stores an associated subscriber verification private key for each respective EPK 114 recognized by the subscriber validation service 122. As shown in FIG. 4, the private key vault 414 in this particular integrated embodiment also stores operational private keys 418, associated with the public OAK and OEK keys transmitted to the vehicle communication manager 112. The operational private keys 418 may be applied to messages by the processor 410 in the same manner as just described for the subscriber verification private keys 416.

The processor 410 is coupled to at least one network interface 440 through which communication links 106 with the network 105 are established. For embodiments where the network 105 comprises an IP network, the data service system 120 comprises an IP stack 420 through which communications traffic via links 106 are transmitted and received. In one embodiment, the data service system 120 further comprises a vehicle data service protocol 455 which may be stored in the memory 412 and executed by the processor 410 to carry out the subscription validation sequence 210, session initiation sequence 230 and data service exchanges 250 attributed to the data service system 120. Moreover, as shown in FIG. 4, the data service system 120 further comprises a temporary key store 460 (which may be within memory 412) for storing the public OAK and OEK, the KDK, and the MAK and MEK keys used through-out the subscription validation sequence 210, session initiation sequence 230 and data service exchanges 250. The data service system 120 may further comprise at least one authentication and encryption function 465 stored in the memory 412 and executed by the processor 410 to carry out the message signing, authentication, encryption, and decryption processes using the public and symmetrical keys associated with those cryptographic processes performed at the data service system 120. For embodiments where IVs are used together with the MEK, the data service system 120 may further comprise the IV generator 268 which may be a stand-alone hardware component or an application executed by the processor 410.

In one embodiment, the data service system 120 comprises a subscription verification function 470 which may be stored in the memory 412 and executed by the processor 410 to perform the subscription status and options check at 215 of the subscription validation sequence. In one embodiment, subscription status and options information is stored in the memory 412 which may be updated at some periodic basis. The subscription verification function 470 may then access this information from the memory 412. In other embodiments, the subscription verification function 470 may communicate with another subscription status and options information (such as via network 105) in order to validate the subscription status and optional service available to a vehicle. In some embodiments, the subscription verification function 470 may utilize the Protocol ID and/or Client ID to retrieve information regarding the subscription status, and encryption availability, and other optional service available to a vehicle. The vehicle data service 450 may comprise a plurality of functions executed by processor 410 and/or distributed across other processing systems for delivering the vehicle data services subscribed to by the operator of the vehicle 110. That is, the data service DL messages 253 and data service UL messages 256 exchanged with the vehicle communication manager 112 are processed by the vehicle data service 450 to provide the vehicle 110 with the data to which it subscribes. For example, in the case where vehicle 110 comprises an aircraft and data service system 120 provides ACARS data services, the vehicle data service 450 is the element of the host data service 124 that actually performs and provides the ACARS data services.

Figure 5:
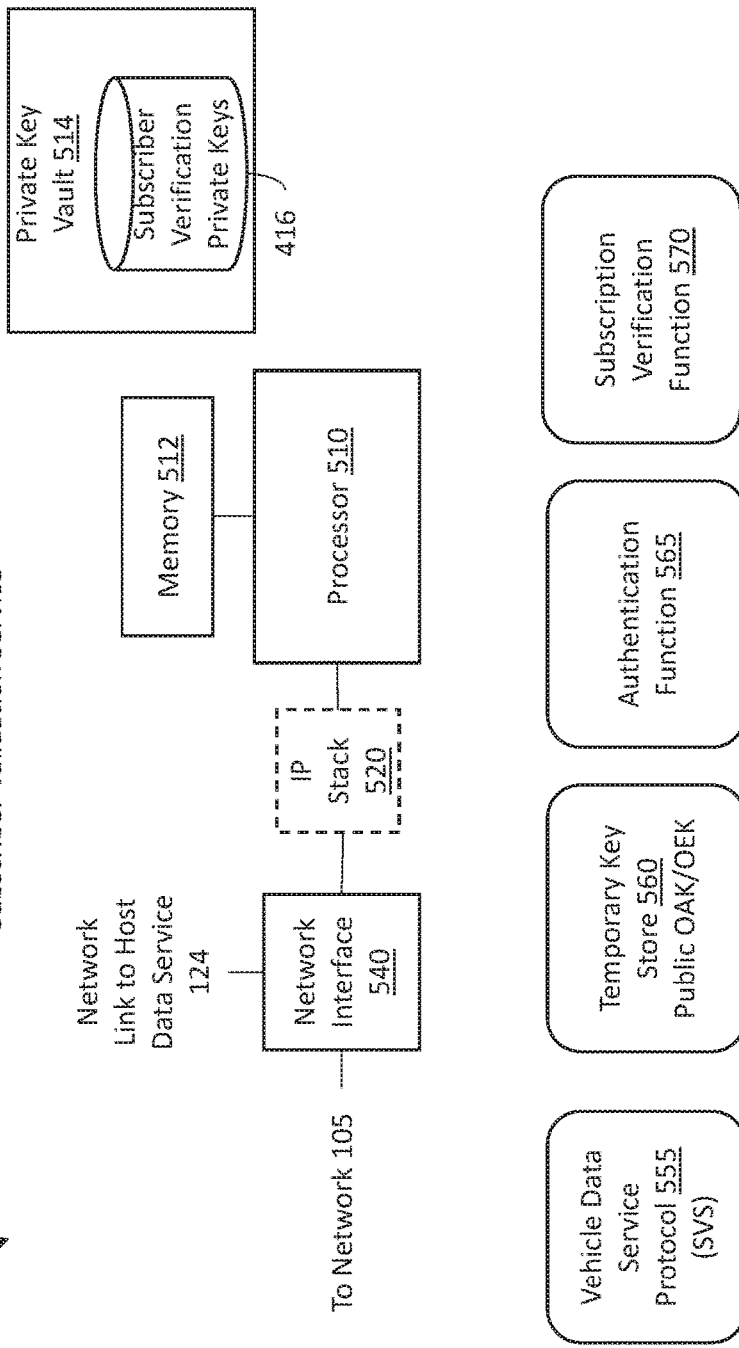
FIG. 5 is a block diagram illustrating a subscriber validation service of a non-integrated data service system for a vehicle data service system of one embodiment of the present disclosure.
Figure 6:
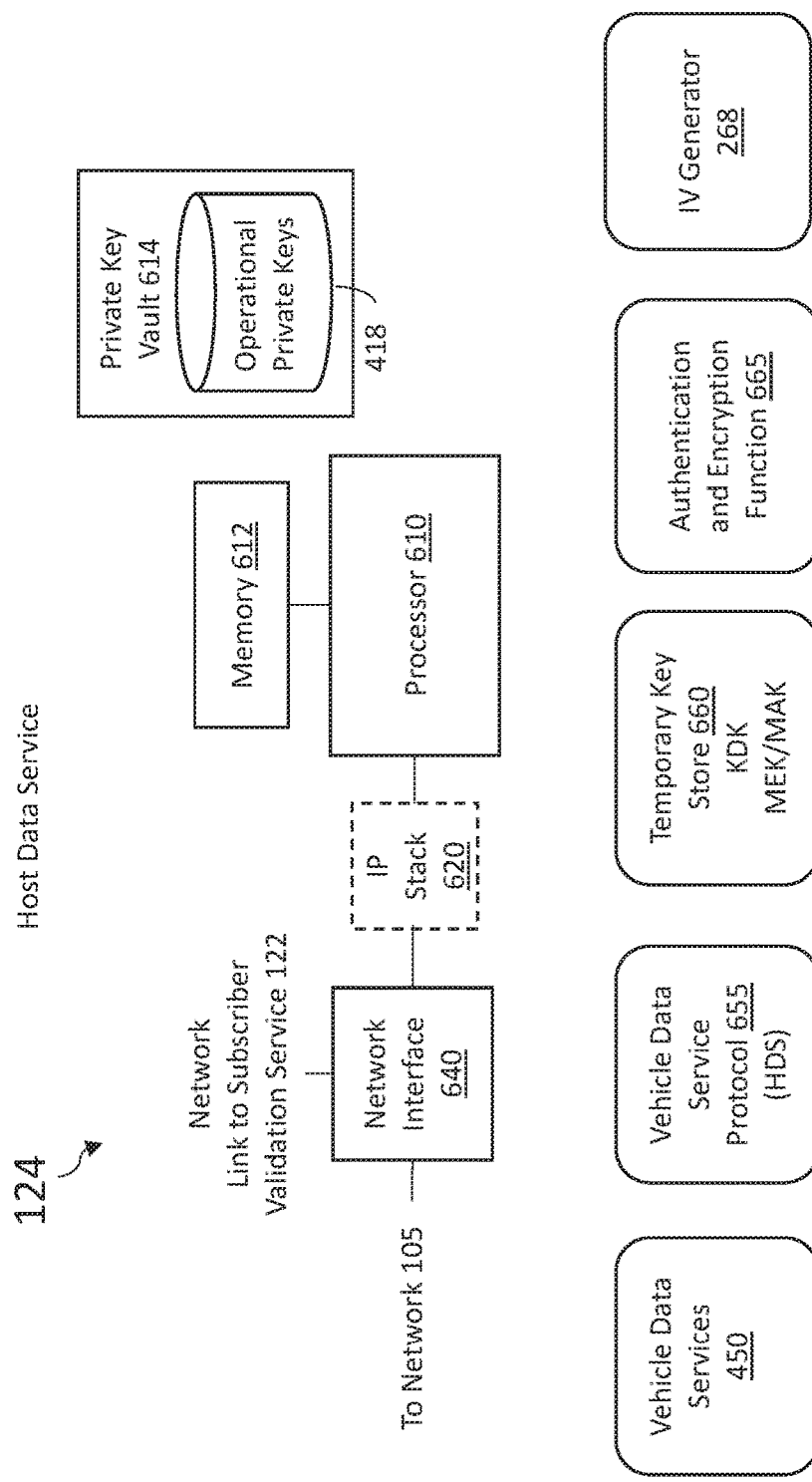
FIG. 6 is a block diagram illustrating a host data service of a non-integrated data service system for a vehicle data service system of one embodiment of the present disclosure.

FIGS. 5 and 6 are block diagrams illustrating a data service system 120 of one embodiment of the present disclosure where the subscriber validation service 122 and host data service 124 are not integrated, but are instead fully separate services. That is, the functions of the subscriber validations service 112 and the host data service 124 are separated. In this embodiment, the subscriber validation service 122 may receive the public OEK and OAK from the host data service 124 (so that it may forward them to the vehicle 110 to complete the subscription validation sequence 210) but not receive the associated private OEK and OAK, which are instead maintained strictly by the host data service 124. This configuration has the advantage of providing end-to-end security from the perspective of the host data service 124 because the subscriber validation service 122 is out of the loop and not involved in the communication of data service DL and UL messages, even though the subscriber validation service 122 will still first validate that the host data service 124 is authorized to have data service exchanges with a specific vehicle 110. The operator of the host data service 124 will generate and maintain the public and private OEK and OAK.

FIG. 5 is a block diagram illustrating the subscriber validation service 122 for such an embodiment. In the embodiment shown in FIG. 5, the subscriber validation service 122 comprises a processor 510 coupled to a memory 512 and programmed to execute code to perform the functions of the subscriber validation service 122 described in this disclosure. The processor 510 has access to a private key vault 514 in which the subscriber verification private keys 516 are securely stored. The private key vault 514 comprises a secure hardware device vault or chip comprising protection mechanisms designed to store private keys in an encrypted format such as described with respect to FIG. 4 and private key vault 414.

In one embodiment, when a message needs to be signed or authenticated using a private key, the message is sent to the private key vault 514 and processed internally by the private key vault 514 which then generates an output that is signed or authenticated using the appropriate private key. In one embodiment, the private key vault 514 stores an associated subscriber verification private key for each respective EPK 114 recognized by the subscriber validation service 122. The processor 510 is coupled to at least one network interface 540 through which one or more communication links 106 with the network 105 are established. For embodiments where the network 105 comprises an IP network, the subscriber validation service 122 comprises an IP stack 520 through which communications traffic via links 106 are transmitted and received. In one embodiment, the subscriber validation service 122 further comprises a vehicle data service protocol 555 which may be stored in the memory 412 and executed by the processor 410 to carry out the subscription validation sequence 210 attributed to the subscriber validation service 122. Moreover, as shown in FIG. 5, the subscriber validation service 122 further comprises a temporary key store 560 (which may be within memory 512) for storing the public OAK and OEK, keys used during the subscription validation sequence 210. The subscriber validation service 122 may further comprise at least one authentication function 565 stored in the memory 512 and executed by the processor 510 to carry out message signing and authentication processes using public keys.

In one embodiment, the subscriber validation service 122 comprises a subscription verification function 570 which may be stored in the memory 512 and executed by the processor 510 to perform the subscription status, encryption availability, and options check at 215 of the subscription validation sequence 210. In one embodiment, subscription status, encryption availability, and options information is stored in the memory 512 which may be updated at some periodic basis. The subscription verification function 570 may then access this information from the memory 512. In other embodiments, the subscription verification function 570 may communicate with another subscription status and options information (such as via network 105) in order to validate the subscription status and optional service available to a vehicle. In some embodiments, the subscription verification function 570 may utilize the Protocol ID and/or Client ID to retrieve information regarding the subscription status and optional service available to a vehicle.

FIG. 6 is a block diagram illustrating the host data service 124 for a non-integrated embodiment. In the embodiment shown in FIG. 6, the host data service 124 comprises a processor 610 coupled to a memory 612 and programed to execute code to perform the functions of the host data service 124 described in this disclosure. The processor 610 has access to a private key vault 614 in which securely stores the operational private keys 518 associated with the public OAK and OEK keys transmitted to the vehicle communication manager 112. The private key vault 614 comprises a secure hardware device vault or chip comprising protection mechanisms designed to store private keys in an encrypted format such as described with respect to FIG. 4 and private key vault 414.

In one embodiment, when a message needs to be signed or authenticated using a private key, or the KDK decrypted using a private key, the message is sent to the private key vault 614 and processed internally by the private key vault 614 which then generates an output that is decrypted, signed/and or authenticated using the appropriate private key. In one embodiment, the private key vault 614 stores an associated private OAK and OEK keys for each set of public OAK and OEK keys utilized for the host data service 124. The processor 610 is coupled to at least one network interface 640 through which one or more communication links 106 with the network 105 are established. For embodiments where the network 105 comprises an IP network, the host data service 124 comprises an IP stack 620 through which communications traffic via links 106 are transmitted and received. In one embodiment, the host data service 124 further comprises a vehicle data service protocol 555 which may be stored in the memory 612 and executed by the processor 610 to carry out the session initiation sequence 230 and data service exchanges 250 attributed to host data service 124. Moreover, as shown in FIG. 6, the host data service 124 further comprises a temporary key store 660 (which may be within memory 612) for storing the public OAK and OEK keys, the KDK, and the MAK and MEK keys used during the session initiation sequence 230 and data service exchanges 250. The host data service 124 may further comprise at least one authentication and encryption function 665 stored in the memory 612 and executed by the processor 610 to carry out message signing, authentication, encryption, and decryption processes using the public and symmetrical keys associated with those cryptographic processes performed at the host data service 124. The host data service 124 may further comprise the IV generator 268 which may be a stand-alone hardware component or an application executed by the processor 410.

The host data service 124 further comprises the vehicle data service 650, which may include a plurality of functions executed by processor 610 and/or distributed across other processing systems for delivering the vehicle data services subscribed to by the operator of the vehicle 110. That is, the data service DL messages 253 and data service UL messages 256 exchanged with the vehicle communication manager 112 are processed by the vehicle data service 650 to provide the vehicle 110 with the data to which it subscribes. For example, in the case where vehicle 110 comprises an aircraft and data service system 120 provides ACARS data services, the vehicle data service 650 is the element of the host data service 124 that actually performs and provides the ACARS data services.

Example Embodiments

Example 1 includes a vehicle communication manager device located onboard a vehicle, the device comprising: a memory comprising a non-volatile memory device storing a fixed embedded public key, wherein the embedded public key is a public key of a public-private key pair associated with a data service system not onboard the vehicle; a processor in communication with a wireless datalink transceiver; a vehicle data service protocol executed by the processor, wherein the vehicle data service protocol initiates a communication session for data service exchanges with the data service system via the wireless datalink transceiver; wherein the vehicle data service protocol causes the processor to: transmit a session request message to the data service system, and receive a session reply message from the data service system in response to the session request message, wherein the session reply message indicates if the vehicle communication manager is authorized for encrypted data service exchanges, and wherein the processor is configured to validate an authenticity of the session reply message using the embedded public key; determine whether to enable message encryption if the session reply message indicates that the vehicle communication manager is authorized for encrypted data service exchanges, and transmit an initialization request message to the data service system that includes an indication of whether message encryption is elected; generate a key derivation key and transmit the key derivation key to the data service system, wherein the key derivation key is encrypted within the initialization request message using a public operational encryption key received in the session reply message; receive an initiation response message from the data service system that includes an indication confirming whether message encryption is elected; when the initiation response message confirms that message encryption is elected generate at least one Message Encryption Key (MEK) by applying the key derivation key to a key derivation function; encrypt data service downlink messages transmitted to a host data service of the data service system using the at least one message encryption key, and decrypt data service uplink messages received from the host data service using the at least one message encryption key.

Example 2 includes the device of example 1, wherein the session request message includes at least one identifier that identifies the embedded public key stored in the memory.

Example 3 includes the device of any of examples 1-2, wherein the vehicle data service protocol includes a session validation sequence that causes the processor to: transmit the session request message to the data service system, the session request message including at least one identifier that identifies the embedded public key; and wherein the session reply message includes a public operational authentication key, a public operational encryption key, and is signed with a subscriber validation private key associated with the embedded public key.

Example 4 includes the device of example 3, wherein the vehicle data service protocol includes a session initiation sequence that causes the processor to: transmit the initiation request message to the data service system, the session request message; validate the authenticity of the initiation response message received from the data service system using the public operational authentication key; and in response to affirmatively validating the initiation response message, apply the key derivation key to the key derivation function to generate the at least one message encryption key.

Example 5 includes the device of example 4, wherein the data service system comprises a subscription validation service and the host data service, wherein the vehicle communication manager communicates with the subscription validation service during the session validation sequence, and wherein the vehicle communication manager communicates with the host data service during the session initiation sequence.

Example 6 includes the device of example 5, wherein the session validation sequence is accessible through a first network address and the host data service is accessible through a second network address, wherein the second network address is communicated to the vehicle communication manager by the session reply message.

Example 7 includes the device of any of examples 1-6, wherein the at least one message encryption key comprises a first message encryption key associated with data service uplink messages and a second message encryption key, different from the first message encryption key, associated with data service downlink messages.

Example 8 includes the device of any of examples 1-7, wherein the vehicle is an aircraft comprising either a communication management unit or a communication management function that executes the vehicle data service protocol.

Example 9 includes the device of any of examples 1-8, further comprising an initialization vector generator that outputs initialization vectors; wherein the processor encrypts the data service downlink messages as a function of the at least one message encryption key and at least one initialization vector; wherein the processor decrypts the data service uplink messages as a function of the at least one message encryption key and the at least one initialization vector.

Example 10 includes a vehicle data service system for providing to a vehicle encrypted access to data services, the vehicle data service system comprising: a processor in communication with a network interface; a private key vault device coupled to the processor; a vehicle data service protocol executed by the processor, wherein the vehicle data service protocol establishes a communication session for data service exchanges with a vehicle communication manager onboard the vehicle via the network interface; wherein the vehicle data service protocol includes a session validation sequence that causes the processor to: determine a subscription status for the vehicle based on at least one identifier received from the vehicle in a session request message, wherein the at least one identifier identifies an embedded public key stored in vehicle communication manager, wherein the subscription status indicates whether encryption services are available for the vehicle communication manager; send a session reply message to the vehicle in response to the session request message, wherein the session reply message indicates if the vehicle communication manager is authorized for encrypted data service exchanges, wherein the session reply message is signed using a subscriber validation private key associated with the embedded public key.

Example 11 includes the vehicle data service system of example 10, wherein the session reply message further includes a public operational authentication key and a public operational encryption key.

Example 12 includes the vehicle data service system of example 11, wherein the public operational authentication key and the public operational encryption key are retrieved from a host data service based on the subscription status.

Example 13 includes the vehicle data service system of any of examples 11-12, wherein the data service system comprises a subscription validation service and a host data service, wherein the vehicle communication manager communicates with the subscription validation service during the session validation sequence.

Example 14 includes the vehicle data service system of example 13, wherein the vehicle data service protocol further includes a session initiation sequence, wherein the vehicle communication manager communicates with the host data service during the session initiation sequence, wherein the session initiation sequence comprises: extracting a key derivation key from an initialization request message received from the vehicle communication manager, and applying the key derivation key to a key derivation function to generate at least one message encryption key when the subscription status indicates that encryption services are available for the vehicle communication manager and the initialization request message includes an indication that message encryption is elected; wherein the host data service is configured to encrypt data service uplink messages sent to the vehicle communication manager during the communication session using the at least one message encryption key; wherein the host data service is configured to decrypt data service downlink messages received from the vehicle communication manager during the communication session using the at least one message encryption key.

Example 15 includes the vehicle data service system of example 14, the host data service further comprising an initialization vector generator that outputs initialization vectors; wherein the host data service encrypts the data service uplink messages as a function of the message encryption key and at least one initialization vector.

Example 16 includes the vehicle data service system of example of 15, wherein the host data service decrypts the data service downlink messages as a function of the message encryption key and the at least one initialization vectors.

Example 17 includes the vehicle data service system of any of examples 14-16, wherein the at least one message encryption key comprises a first message encryption key associated with data service uplink messages and a second message encryption key, different from the first message encryption key, associated with data service downlink messages Example 18 includes the vehicle data service system of any of examples 14-17, wherein the key derivation key in the initialization request message is encrypted.

Example 19 includes the vehicle data service system of any of examples 13-18, wherein the subscription validation service is accessible through a first network address and the host data service is accessible through a second network address, wherein the second network address is communicated to the vehicle communication manager by the session reply message.

Example 20 includes the vehicle data service system of any of examples 10-19, wherein the vehicle is an aircraft comprising either a communication management unit or a communication management function that implements the vehicle communication manager.

In various alternative embodiments, system and/or device elements, method steps, or example implementations described throughout this disclosure (such as but not limited to any of the Vehicle Communication Manager, Data Service System Subscriber Validation Service, Host Data Service, Public Key Stores, Private Key Vaults, IV Generators, Data Service Protocols, Network Interfaces, Authentication and Encryption Functions, Subscription Verification Functions or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "server", "system", "service", "manager", "unit", "transceiver", "circuit", "memory", "module", "interface", "stack", "generator" each refer to non-generic device elements that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A vehicle data service system for providing to a vehicle encrypted access to data services, the vehicle data service system comprising:
   a processor in communication with a network interface;
   a private key vault device coupled to the processor;
   a vehicle data service protocol executed by the processor, wherein the vehicle data service protocol establishes a communication session for data service exchanges with a vehicle communication manager onboard the vehicle via the network interface;
   wherein the vehicle data service protocol includes a session validation sequence that causes the processor to:
      determine a subscription status for the vehicle based on at least one identifier received from the vehicle in a session request message, wherein the at least one identifier identifies an embedded public key stored in vehicle communication manager, wherein the subscription status indicates whether encryption services are available for the vehicle communication manager;
      send a session reply message to the vehicle in response to the session request message, wherein the session reply message indicates if the vehicle communication manager is authorized for encrypted data service exchanges, wherein the session reply message is signed using a subscriber validation private key associated with the embedded public key.

2. The vehicle data service system of claim 1, wherein the session reply message further includes a public operational authentication key and a public operational encryption key.

3. The vehicle data service system of claim 2, wherein the public operational authentication key and the public operational encryption key are retrieved from a host data service based on the subscription status.

4. The vehicle data service system of claim 2, wherein the data service system comprises a subscription validation service and a host data service, wherein the vehicle communication manager communicates with the subscription validation service during the session validation sequence.

5. The vehicle data service system of claim 4, wherein the vehicle data service protocol further includes a session initiation sequence, wherein the vehicle communication manager communicates with the host data service during the session initiation sequence, wherein the session initiation sequence comprises:
   extracting a key derivation key from an initialization request message received from the vehicle communication manager, and
   applying the key derivation key to a key derivation function to generate at least one message encryption key when the subscription status indicates that encryption services are available for the vehicle communication manager and the initialization request message includes an indication that message encryption is elected;
   wherein the host data service is configured to encrypt data service uplink messages sent to the vehicle communication manager during the communication session using the at least one message encryption key;
   wherein the host data service is configured to decrypt data service downlink messages received from the vehicle communication manager during the communication session using the at least one message encryption key.

6. The vehicle data service system of claim 5, the host data service further comprising an initialization vector generator that outputs initialization vectors;
   wherein the host data service encrypts the data service uplink messages as a function of the message encryption key and at least one initialization vector.

7. The vehicle data service system of claim of claim 6, wherein the host data service decrypts the data service downlink messages as a function of the message encryption key and the at least one initialization vectors.

8. The vehicle data service system of claim 5, wherein the at least one message encryption key comprises a first message encryption key associated with data service uplink messages and a second message encryption key, different from the first message encryption key, associated with data service downlink messages.

9. The vehicle data service system of claim 5, wherein the key derivation key in the initialization request message is encrypted.

10. The vehicle data service system of claim 4, wherein the subscription validation service is accessible through a first network address and the host data service is accessible through a second network address, wherein the second network address is communicated to the vehicle communication manager by the session reply message.

11. The vehicle data service system of claim 1, wherein the vehicle is an aircraft comprising either a communication management unit or a communication management function that implements the vehicle communication manager.

* * * * *